US006725736B1

(12) United States Patent
Sturesson

(10) Patent No.: US 6,725,736 B1
(45) Date of Patent: Apr. 27, 2004

(54) ROTATABLE ECCENTRIC ARRANGEMENT

(76) Inventor: Rune Sturesson, Golfbanevägen 31, S-302 70, Halmstad (SE)

( * ) Notice: Subject to any disclaimer, the term of this patent is extended or adjusted under 35 U.S.C. 154(b) by 0 days.

(21) Appl. No.: 09/743,845

(22) PCT Filed: Jul. 12, 1999

(86) PCT No.: PCT/SE99/01256

§ 371 (c)(1), (2), (4) Date: Mar. 26, 2001

(87) PCT Pub. No.: WO00/05454

PCT Pub. Date: Feb. 3, 2000

(30) Foreign Application Priority Data

Jul. 13, 1998 (SE) .............................................. 9802522

(51) Int. Cl.[7] ................................................ F16H 33/10

(52) U.S. Cl. ................................ 74/87; 74/61; 404/117

(58) Field of Search ........................ 74/61, 87; 404/117, 404/122, 133.05; 198/770; 172/40

(56) References Cited

U.S. PATENT DOCUMENTS

| | | | | |
|---|---|---|---|---|
| 2,192,420 A | * 3/1940 | Stroud | 209/366.5 |
| 2,771,279 A | * 11/1956 | Dearden | 366/128 |
| 2,861,458 A | * 11/1958 | Awedissjan | 74/87 |
| 3,598,029 A | * 8/1971 | Paramythioti | 404/117 |
| 3,896,677 A | 7/1975 | Larsson | |
| 3,909,147 A | * 9/1975 | Takata | 181/114 |
| 4,340,469 A | * 7/1982 | Archer | 209/315 |
| 4,550,622 A | * 11/1985 | La Bonte et al. | 366/116 |
| 4,830,534 A | * 5/1989 | Schmelzer et al. | 404/117 |
| 5,666,852 A | * 9/1997 | Musschoot | 198/770 |
| 5,909,074 A | * 6/1999 | Takaya et al. | 310/81 |
| 6,224,293 B1 | * 5/2001 | Smith | 404/117 |
| 6,234,718 B1 | * 5/2001 | Moffitt et al. | 172/40 |

FOREIGN PATENT DOCUMENTS

| | | |
|---|---|---|
| DE | 3902659 A1 | 8/1989 |
| GB | 645064 A | 10/1950 |
| GB | 1267148 A | 3/1972 |

* cited by examiner

*Primary Examiner*—Jack Lavinder
*Assistant Examiner*—Bradley King
(74) *Attorney, Agent, or Firm*—Patterson, Thuente, Skaar & Christensen, P.A.

(57) ABSTRACT

The present invention relates to a rotatable eccentric element for continuous adjustment of vibration amplitude, for use in, for example, the roll in vibrating rollers. In particular, the invention relates to a rotatable eccentric arrangement adapted for stepless adjustment of vibration amplitude, comprising a rotatable shaft (1) with an eccentric weight (2) arranged in a fixed manner thereon and a movable weight (5) which is pivotable relative to the fixed weight between a position with maximum amplitude and a position with minimum amplitude for changing the vibration amplitude of the arrangement. The invention is characterized in that the pivoting axis for the pivoting of the movable eccentric weight (5) is displaced from the axis of rotation of the shaft (1) and at least to an extent towards the centre of gravity of the fixed weight (2).

14 Claims, 4 Drawing Sheets

ROTATABLE ECCENTRIC ARRANGEMENT

TECHNICAL FIELD

The present invention relates to a rotatable eccentric element for continuous adjustment of vibration amplitude, for use in, for example, the roll in vibrating rollers. In particular, the invention relates to a rotatable eccentric arrangement adapted for stepless adjustment of vibration amplitude, comprising a rotatable shaft with an eccentric weight arranged in a fixed manner thereon and a movable weight which is pivotable relative to the fixed weight between a position with maximum amplitude and a position with minimum amplitude for changing the vibration amplitude of the arrangement.

BACKGROUND

In the packing of earth, asphalt or similar material using vibrating rollers, the best packing effect is obtained initially if the amplitude is high. After the material has been hard-packed, however, the roll starts to move irregularly and bounce on the surface. This impairs the packing and leads moreover to great stresses on the roller. By reducing the amplitude, this is avoided and the degree of packing can be increased further. This regulation can be effected using electronics and hydraulics, under the control of a packing meter mounted on the roller, which continuously measures the firmness (degree of packing) of the surface. Such an arrangement for continuous adjustment of vibration amplitude is described in, for example, SE 443 591.

However, this previously known arrangement is complicated to produce.

It is also desirable to be able to assess and determine the bearing life because this normally varies greatly depending on use. This is due to the tact that the centrifugal force increases with the frequency and the amplitude, and the stress on the bearings, and thus their life also, is dependent on the magnitude of the centrifugal force.

During asphalt packing, the rolls should not vibrate when the roller is at a standstill or changing its direction of travel. The rollers on the market stop the rotation of the eccentric element before the roller stops or changes the direction of travel. If the eccentric element is started and stopped when the amplitude is great, the result is a resonant frequency with undesirable vibrations as a consequence. It is therefore desirable to be able to start the rotation of the eccentric element essentially without amplitude and to be able to provide the amplitude at the desired frequency, that is to say the desired speed of rotation. It is also desirable to be able to adjust to zero amplitude even with full frequency.

THE OBJECT OF THE INVENTION

It is therefore an object of the present invention to provide a rotatable eccentric arrangement of the type indicated in the introduction, where the abovementioned disadvantages of the known art are completely or at least partly eliminated.

This object is achieved by means of a rotatable eccentric arrangement according to the appended patent claims.

BRIEF DESCRIPTION OF THE DRAWINGS

In the appended drawings.

DESCRIPTION OF PREFERRED EMBODIMENTS

The invention will now, for the purpose of exemplification, be described in greater detail by means of a preferred exemplary embodiment. The invention comprises a rotatable eccentric arrangement with steplessly adjustable imbalance.

Figure 1:
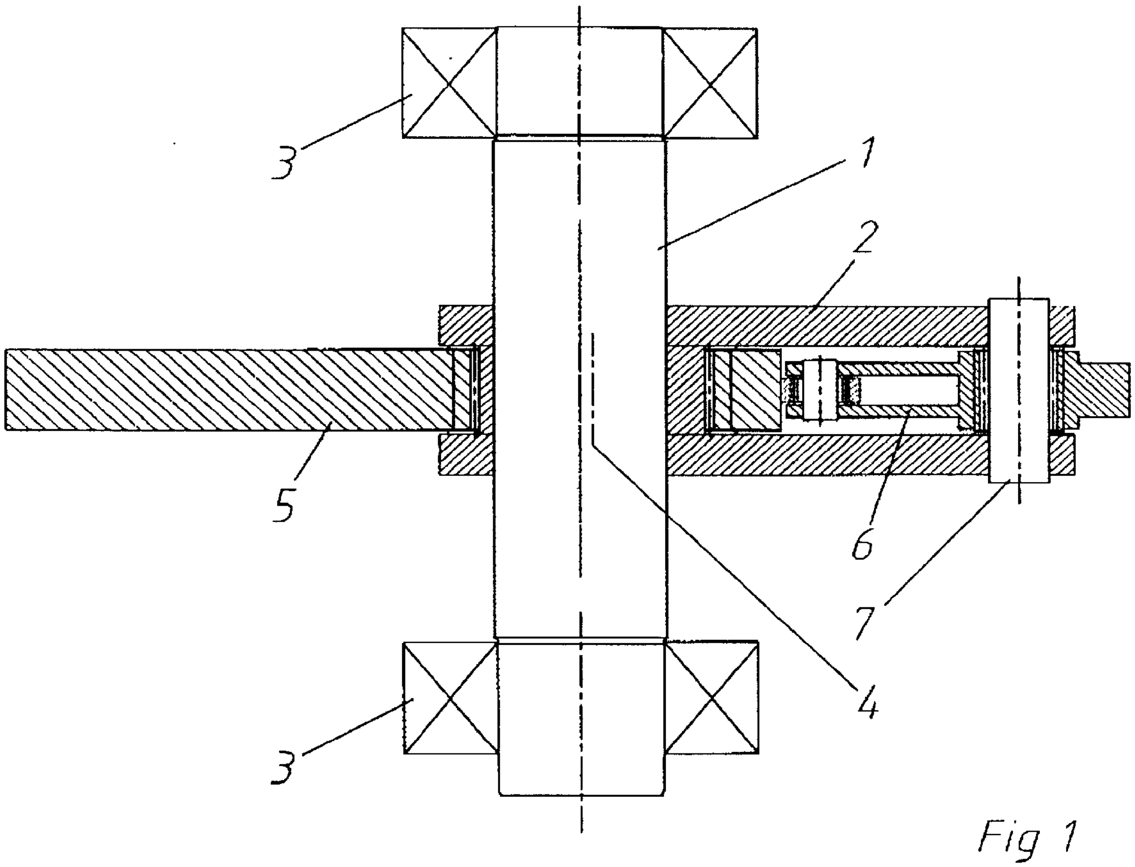
FIG. 1 shows a view from above of a preferred embodiment of an arrangement according to the invention.
Figure 3:
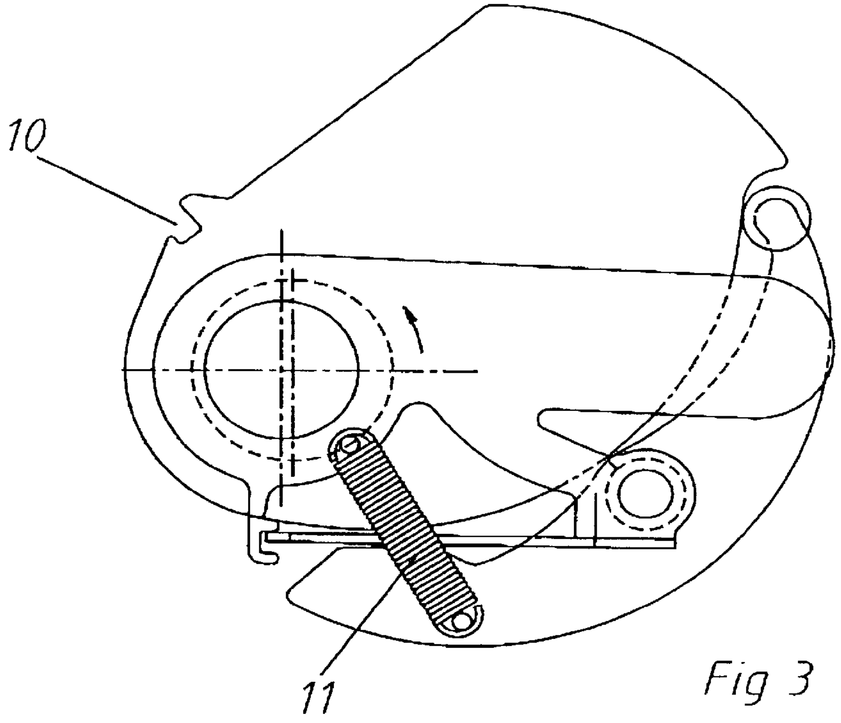
FIG. 3 shows a view from the side (that is to say in the axial direction) of the arrangement in FIG. 1 with the movable weight in the position for maximum amplitude.
Figure 2:
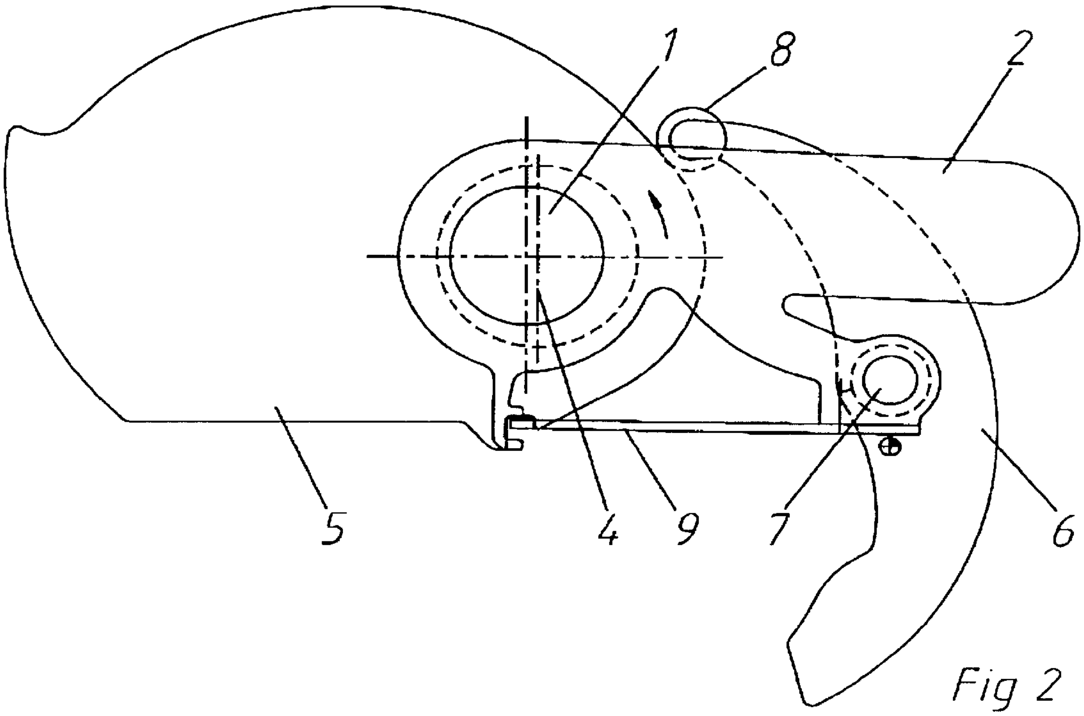
FIG. 2 shows a view from the side (that is to say in the axial direction) of the arrangement in FIG. 1 with the movable weight in the position for minimum amplitude.

A preferred embodiment of the invention, as shown in FIG. 1, comprises a shaft 1 which is rotatably mounted in two rotary bearings 3 and arranged inside the roll of a vibrating roller. In the exemplary embodiment, the shaft is intended to rotate anti-clockwise in the figures. Fastened on the shaft are two fixed weights 2 and, between these, a movable weight 5. The movable weight is mounted so that it is pivotable relative to the fixed weights 2.

If the movable weight 5 has a common centre of rotation with the shaft, it will, owing to the centrifugal force, adopt a position which produces minimum amplitude. Preferably, however, the pivoting axis 4 for the pivoting of the movable weight is displaced slightly from the centre of rotation of the shaft towards the centre of gravity of the fixed weights. In the event that this displacement is great, the centrifugal force when the shaft rotates will in this way instead act so as to guide the movable weight so that its centre of gravity is guided towards the centre of gravity of the fixed weights, that is to say the position in which the weights, taken together, give the greatest vibration amplitude. In an intermediate displacement position, however, which is desirable here, the influence of the centrifugal force will be minimized.

A third weight 6 is furthermore pivotably fastened on the fixed weights 2 on a shaft 7 at a distance from the axis of rotation. This third weight has a somewhat elongate shape and a centre of gravity which is displaced to one side relative to its pivoting axis. On the opposite side of the pivoting axis, the third weight is provided with an end intended to bear against the movable second weight. This end is preferably provided with a support roller 8 in order to reduce friction. The movable weight is also provided with a curved side surface against which the end of the third weight bears and the distance of which from the axis of rotation of the shaft increases continuously in one direction, at least over a part of the curved surface. Moreover, the curved surface preferably has a varying angle relative to the centre of the shaft 1, that is to say so that the tangent of the curved surface has a varying angle in relation to a line connecting a corresponding point on the curved surface and the centre of the shaft 1. The movable weight and the third weight are designed and arranged in relation to one another in such a manner that the third weight can, with its end adapted for the purpose, slide along at least a section of this curved surface which is designed there so that a force with which the third weight acts against the movable weight produces a smaller torque for the movable weight when it is located in the position for minimum amplitude than in the position for maximum amplitude, and moreover increases continuously in between. This section of the curved surface preferably has a continuously varying distance from the centre of rotation of the shaft so that, when the movable weight is located in the position with the greatest amplitude, the bearing end of the third weight is located on that part of the curved section at the greatest distance from the axis of rotation, and, when the movable weight is located in the position with the smallest amplitude, it is located on that part of the curved section at the smallest distance from the centre of rotation. In this way, the third weight will during rotation, owing to the centrifugal force, exert a force against the movable weight which, owing to the curved surface of this weight, is converted into a force which acts so as to guide the movable weight from the position with maximum amplitude towards the position with minimum amplitude. This force increases with the frequency (speed of rotation). By means of correct design of the curve against which the support roller presses, and selection of the heaviness of the respective weights, or, as the case may be, how the centres of gravity are arranged in relation to the pivoting axes, balance is obtained with the torque which acts so as to pivot the movable weight 5 towards the fixed weights and which increases with the amplitude, and a relatively fixed interrelationship between amplitude and frequency can be obtained for all amplitudes and frequencies.

In order to facilitate regulation, the movable weight 6 can also be prestressed by a spring 11 acting so as to guide it clockwise. This makes regulation more dependent on the speed of rotation.

In this way, an arrangement with automatic regulation between frequency and amplitude can be obtained, so that the amplitude is at a maximum when the frequency is low and then increases gradually to a state of minimum amplitude when the frequency is at a maximum, and so that the centrifugal force and thus the load on the bearings is kept essentially constant.

In order for it to be possible to start the rotation of the eccentric element without amplitude or with low amplitude, there is a retaining means in the form of a spring 9 which is screwed firmly to the fixed weights 2 and hooks into a recess 10 on the movable weight 5 when the rotation is stopped. When the rotation is started again, the centrifugal force causes the spring to bend out of the recess so that the movable weight 5 can rotate clockwise in relation to the fixed weights 2. However, other retaining means which are released at a given force or a given rotation frequency are of course possible By means of the solution according to the invention, the amplitude is reduced at higher frequency and increased at lower frequency so that the bearings wear essentially evenly irrespective of the amplitude, as this is adapted according to the frequency, the desired life of the bearings being achieved irrespective of which amplitude is used. In this way, the frequency or the amplitude can simply be set, either manually or automatically by means of control from a packing meter or the like, so as to obtain optimum packing, at the same time as the load on the bearings is kept essentially constant.

Figure 4:
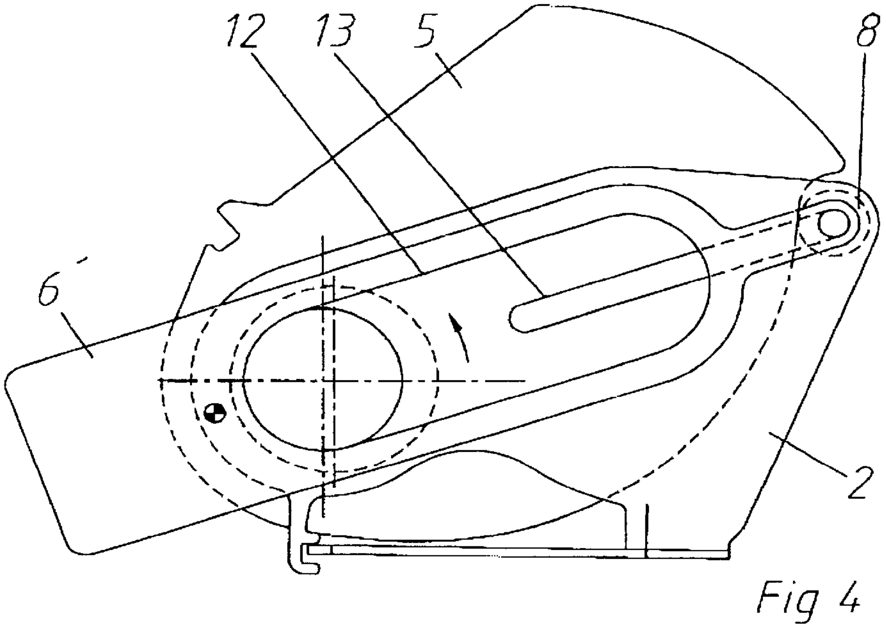
FIG. 4 shows a view from the side (that is to say in the axial direction) of a second embodiment of the invention.

FIG. 4 shows a second exemplary embodiment of an arrangement according to the invention. This embodiment corresponds for the most part to that described previously. In this case, however, the third weight 6' is not pivotable but linearly displaceable. To this end, it comprises a slot 12 which surrounds the shaft 1 and makes possible displacement relative to the shaft. On one side of the shaft 1, the third weight is provided with a support roller 8 which bears against a curved surface on the movable weight 5, as in the example described previously. The third weight also has a projecting pin, preferably in prolongation of the spindle on which the support roller 8 is mounted, which runs in a slot 13 in the fixed weight. This second slot ensures that the third weight has a well-defined, preferably linear, movement path. The centre of gravity of this weight is located on that side of the shaft 1 opposite the support roller. In this way, exactly as in the example above, a force dependent on the speed of rotation is brought about, with which the third weight acts against the movable weight 5 so as to rotate the same towards the position with minimum amplitude.

Figure 5:
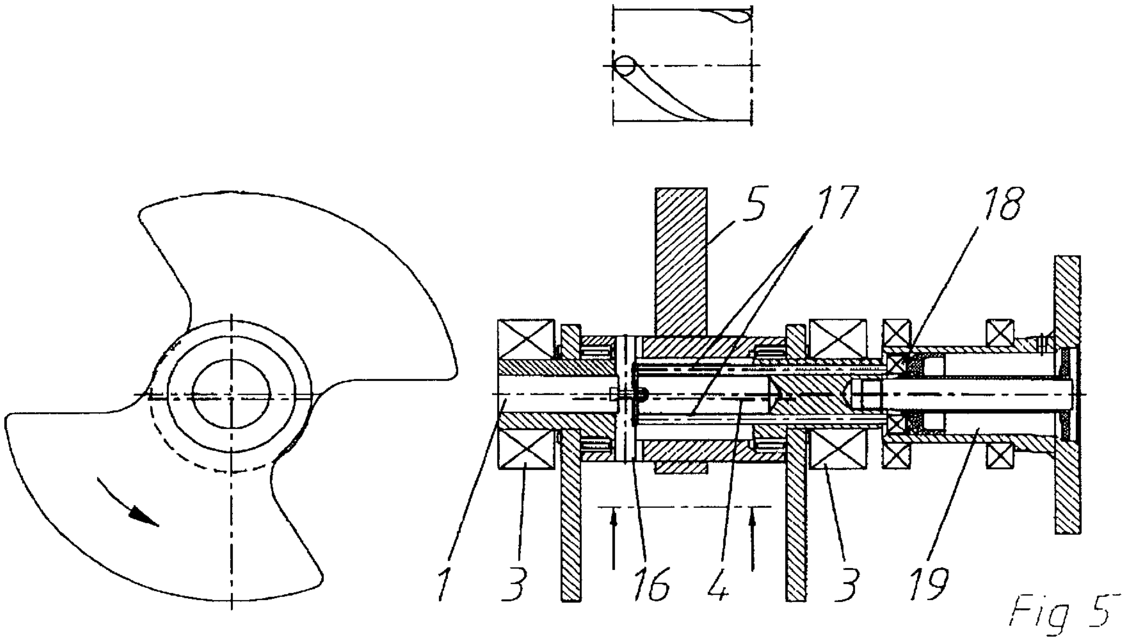
FIG. 5 shows a third embodiment of the invention, seen on the one hand from above and on the other hand from the side (that is to say in the axial direction)

FIG. 5 shows a third exemplary embodiment of an arrangement according to the invention. This embodiment comprises, exactly as in the embodiments described previously, a shaft 1 which is mounted rotatably in two rotary bearings 3. On the shaft 1, there is a tube with a movable eccentric weight 5 which is pivotable in relation to the shaft 1 and fixed weights 2 arranged thereon. This pivoting of the movable weight is obtained by displacing a pin 16 in an axial slot in the shaft 1 and at the same time by means of the ends in a helical slot in the tube of the weight 5. In this way, an axial displacement of the pin 16 will be converted into a rotation of the movable weight in a radial plane relative to the shaft 1. However, it is of course possible instead to make the slot in the shaft helical, or for both slots to be helical but have different pitch.

The displacement of the pin 16 is brought about by one, two or even more axially displaceable rods 17 which run in a corresponding number of holes adapted for this purpose in the shaft 1 and are connected to the inner ring on a rotary bearing 18.

The outer ring on the bearing 18 is connected to a hydraulic cylinder 19 or similar means for bringing about displacement of the rods in the axial direction of the shaft 1. The force from the piston is transmitted via the rods to the rotating pin 16 which in turn causes the various eccentric weights to rotate in relation to one another by means of the axial or, as the case may be, the helical slot.

If the weight 5 has a common centre of rotation with the shaft, it will adopt a position which produces minimum amplitude. By displacing the centre of rotation of the weight 5 towards the centre of gravity of the fixed weights, this force is reduced, and if it is displaced even further, the force will instead be directed in the opposite direction. Without pressure to the piston, the weight will then adopt the position with maximum amplitude. If oil is pumped into the chamber 10, the weights will be rotated in relation to one another and be rotated towards the position with minimum amplitude. By pressurizing the chamber on starting and stopping, the eccentric element can be started and stopped with minimum amplitude or without amplitude. Impact originating from the weight 5 can then be avoided.

In certain cases, such as cases with a double-acting cylinder or an electric actuating device, it may instead be desirable for the displacement to be only so great that the forces are essentially minimized.

Figure 6:
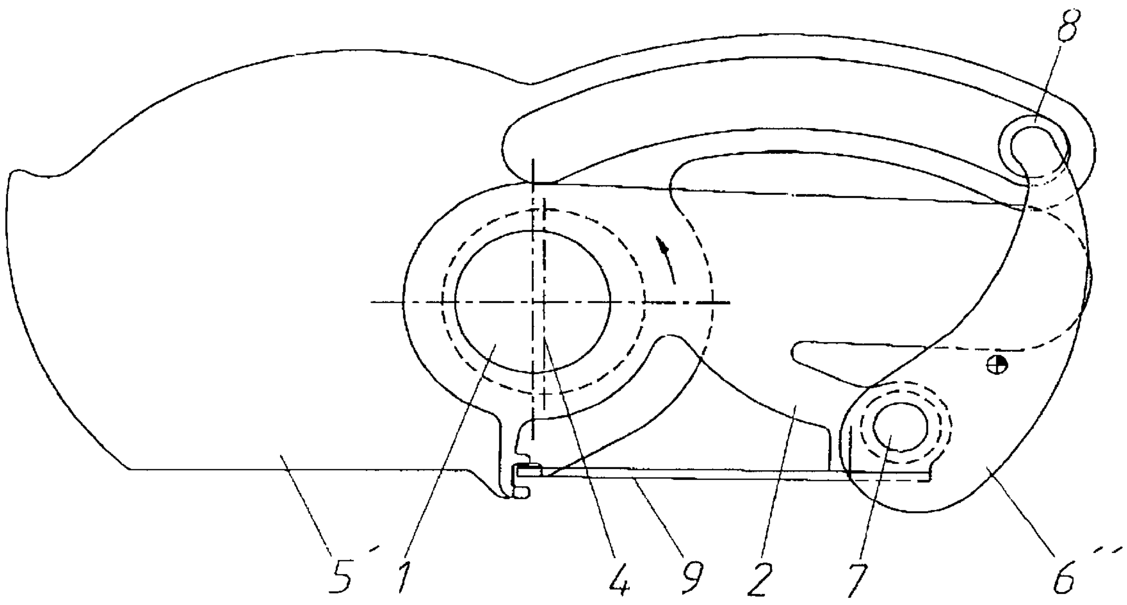
FIG. 6 shows a view from the side (that is to say in the axial direction) of a fourth embodiment of the invention.

Finally, FIG. 6 shows a fourth embodiment of the invention. In this embodiment, the movable weight 5' and the fixed weight 2 are arranged essentially as in the first exemplary embodiment described above. In this exemplary embodiment, however, the third weight 6" is designed so that it has a somewhat elongate shape, with the bearing point against the movable weight 5' at one end and the pivoting axis 7 for its pivoting at the other. Its centre of gravity is consequently located in between. In this case also, the curved surface, which is in this case in the form of a slot in a projecting arm of the movable weight 5', has a distance from the axis of rotation of the shaft increasing continuously in one direction, at least over a part of the curved surface. Moreover, the curved surface preferably has, as previously, a varying angle relative to the centre of the shaft 1. In this embodiment, however, the section of this curved surface has a continuously varying distance from the centre of rotation of the shaft so that, when the movable weight is located in the position with the greatest amplitude, the bearing end of the third weight is located on that part of the curved section at the smallest distance from the axis of rotation, and, when the movable weight is located in the position with the smallest amplitude, it is located on that part of the curved section at the greatest distance from the centre of rotation. In this embodiment, therefore, the curvature takes place in the opposite direction to the earlier embodiment In this way, however, on account of the fact that the centre of gravity in this embodiment lies on the other side of the pivoting point compared with the first embodiment, the third weight will during rotation, owing to the centrifugal force, exert a force, as in the first embodiment, against the movable weight which, owing to the curved surface of this weight, is converted into a force which acts so as to guide the movable weight from the position with maximum amplitude towards the position with minimum amplitude.

It is to be noted that expressions such as "clockwise" and "anti-clockwise", which have been used in the description above relate only to the exemplary embodiments in question and the drawings associated with them. It is of course possible to make the rotation take place in the other direction instead.

The invention has now been described with reference to a few preferred exemplary embodiments. However, other variants of the invention are of course possible. For example, it is possible to use one or more fixed weights, one or more movable weights etc. The invention has furthermore been described in connection with vibrating rollers. Other areas of application for the rotatable eccentric arrangement are possible, however, such as vibrating plates, vibrators for various types of industry etc. Such and other closely-related variants must be considered to be covered by the invention as defined by the appended patent claims.

What is claimed is:

1. A rotatable eccentric arrangement adapted for stepless adjustment of vibration amplitude, comprising a rotatable shaft with at least one fixed eccentric weight arranged in a fixed manner thereon and at least one movable eccentric weight which is pivotable relative to the fixed weight between a position with minimum amplitude and a position with maximum amplitude for changing the vibration amplitude of the arrangement, the movable eccentric weight being restrained in its motion relative to the fixed eccentric weight to less than about one hundred eighty degrees of rotation and characterized in that a pivoting axis for the pivoting of the movable eccentric weight is displaced from the axis of rotation of the shaft towards the center of gravity of the fixed weight and that the movable weight is adapted so as to be automatically pivoted toward the position with maximum amplitude when a vibrational frequency decreases and towards the position with minimum amplitude when the vibrational frequency increases and in that a third weight is movably arranged and adapted such that the centrifugal force during rotation of the eccentric arrangement causes the third weight to exert a force against the movable weight so as to guide the movable weight from the position with maximum amplitude toward the position with minimum amplitude.

2. Eccentric arrangement according to patent claim 1, characterized in that the movable eccentric weight is adapted so as to be automatically pivoted so that centrifugal force which is exerted against bearings, in which the shaft is rotatably mounted, is kept essentially constant.

3. Eccentric arrangement according to claim 1, characterized in that a retaining means is adapted to lock the movable eccentric weight in the position with minimum amplitude at the start of rotation, which retaining means is adapted so as to be released at a given threshold frequency.

4. Eccentric arrangement according to claim 1, characterized in that the movable weight has a curved surface, and in that the third weight has a part bearing against the curved surface, the third weight being adapted in such a manner that the centrifugal force during rotation of the eccentric arrangement causes the bearing part to exert a force against he curved surface, and the surface being such that the force with which the third weight bears against the movable weight acts so as to guide the movable weight from the position with maximum amplitude toward the position with minimum amplitude.

5. Eccentric arrangement according to patent claim 4, characterized in that the curved surface has a continuously decreasing distance to the axis of rotation from a bearing point of the third weight in the position with maximum amplitude to the bearing point at minimum amplitude.

6. Eccentric arrangement according to patent claim 4, characterized in that the curved surface has a continuously increasing distance to the axis of rotation from a bearing point of the third weight in the position with maximum amplitude to the bearing point at minimum amplitude.

7. Eccentric arrangement according to claim 4, characterized in that a spring is arranged so that it exerts a first force, so as to partially counteract a second force with which the bearing part bears against the curved surface.

8. Eccentric arrangement according to claim 1, characterized in that a retaining means is adapted to lock the movable eccentric weight in the position with minimum amplitude at the start of rotation, which retaining means is adapted so as to be released at a given threshold frequency.

9. Eccentric arrangement according to claim 2, characterized in that a retaining means is adapted to lock the movable eccentric weight in the position with minimum amplitude at the start of rotation, which retaining means is adapted so as to be released at a given threshold frequency.

10. Eccentric arrangement according to claim 1, characterized in that the movable weight has a curved surface, and in that a third weight is movably arranged and has a part bearing against the curved surface, the third weight being adapted in such a manner that the centrifugal force during rotation of the eccentric arrangement causes the bearing part to exert a force against he curved surface, and the curvature of the surface being such that the force with which the third weight bears against the movable weight acts so as to guide the movable weight from the position with maximum amplitude towards the position with minimum amplitude.

11. Eccentric arrangement according to claim 2, characterized in that the movable weight has a curved surface, and in that the third weight is movably arranged and has a part bearing against the curved surface, the third weight being adapted in such a manner that the centrifugal force during rotation of the eccentric arrangement causes the bearing part to exert a force against he curved surface, and the curvature of the surface being such that the force with which the third weight bears against the movable weight acts so as to guide the movable weight from the position with maximum amplitude towards the position with minimum amplitude.

12. Eccentric arrangement according to claim 3, characterized in that the movable weight has a curved surface, and in that the third weight is movably arranged and has a part bearing against the curved surface, the third weight being adapted in such a manner that the centrifugal force during rotation of the eccentric arrangement causes the bearing part to exert a force against he curved surface, and the curvature of the surface being such that the force with which the third weight bears against the movable weight acts so as to guide the movable weight from the position with maximum amplitude towards the position with minimum amplitude.

13. Eccentric arrangement according to claim 5, characterized in that a spring is arranged so that it exerts a first force, so as to partially counteract a second force with which the bearing part bears against the curved surface.

14. Eccentric arrangement according to claim 6, characterized in that a spring is arranged so that it exerts a first force, so as to partially counteract a second force with which the bearing part bears against the curved surface.

* * * * *